3,014,842
INJECTABLE BOVINE INSULIN CRYSTAL SUSPENSIONS AND PROCESS OF PRODUCING SAME
Jørgen Schlichtkrull, Bronshoj, Denmark, assignor to Novo Terapeutisk Laboratorium A./S., Copenhagen, Denmark
No Drawing. Filed July 31, 1958, Ser. No. 752,191
Claims priority, application Denmark Aug. 10, 1957
10 Claims. (Cl. 167—75)

It is known to crystallize insulin from an aqueous medium containing ions, hereinafter referred to as M-ions, of one or more of the crystallization-promoting metals (Zn, Cd, Co, Ni and Cu), preferably zinc, and having a pH-value within the range of 5.5 to 7. In the crystallization operation, use is made of a buffer substance, usually sodium phosphate, sodium citrate, ammonium acetate or sodium acetate. As to the use of sodium phosphate buffer and ammonium acetate buffer reference is made to U.S. Patent No. 2,143,590, and as to the use of sodium citrate buffer reference is made to U.S. Patent No. 2,626,228. Sometimes use is also made of an addition of solvents effective to prevent precipitation of amorphous insulin. Examples thereof are acetone, propyl-, butyl- and amyl alcohols.

The insulin crystals thus produced contain M-ions which are chemically bound within the very crystal structure, and the amount thereof varies with the crystallization conditions employed. It may be expressed as the number of metal atoms per unit cell, i.e. the crystallographic unit containing 390 atoms of protein nitrogen, as the amount in percent of metal in the dried crystals or as the amount of metal in gram equivalents per gram of the dried crystals. The term dried crystals is to be understood as meaning crystals having a water content such that they exhibit a content of protein nitrogen of about 14.2%.

When employing citrate buffer the produced crystals are made to contain 2 metal atoms per unit cell corresponding ot 0.34% of zinc. When using the process of U.S. Patent No. 2,143,590, according to which crystallization is effected in the presence of sodium phosphate buffer and recrystallization is effected in the presence of ammonium acetate buffer without additional of zinc ions, the recrystallized crystals will contain 3 atoms of zinc per unit cell of the crystals corresponding to 0.52% of zinc.

If the insulin is made to crystallize from a solution in the absence of zinc-precipitating substances, such as phosphate ions, or substances forming zinc complex compounds, such as citrate ions, use being made, for example, of sodium acetate buffer, the produced crystals will, when use is made of a sufficiently high content of M-ions in the crystallization medium, contain up to 5 metal atoms per unit cell, which, so far as zinc is concerned, corresponds to a zinc content of about 0.8%.

If the crystallization medium has such a high M-ion concentration that an insulin crystal when suspended therein will contain more than about 6 metal atoms per unit cell, insulin crystals will be formed only very slowly or not at-all.

The insulin crystals produced by these methods have a rhombohedral structure and the form of twin crystals, "starts" or deformed rhombohedrons when the insulin is derived from ox or veal pancreas glands.

It should be noted that when employing insulin derived from ox or veal pancreas glands insulin crystals may be obtained having the form of sharp-edged rhombohedrons with plane crystal faces if the crystallization medium contains halogen ions, e.g. in the form of added sodium chloride, in a suitably high concentration, as described in application Serial No. 362,142, filed June 16, 1953, now abandoned. Crystals of this kind are left out of consideration here.

Insulin crystals having a zinc content of 0.52% have been suspended in distilled water and injected into rabbits, as described in J. Pharm., 58, 93–104, 1936, and it has been found that the effect can hardly be distinguished from the quick-acting and brief effect of a solution of the crystals. If, on the other hand, M-ions in a suitable proportion are added to the crystal suspension, a highly protracted effect will, as is known, be obtained, the suspended crystals at neutral reaction (the pH of the blood) combining with M-ions with the formation of a slightly soluble and slowly resorbable insulin-metal-compound containing at least 5–6 metal atoms per unit cell, as described, for example, in Science, vol. 116, No. 3015, 394–398 (1952).

It has now surprisingly been found that it is not a condition for obtaining a highly protracted effect of insulin crystal suspensions that such absorption of crystallization-promoting metals by the insulin crystals take place at pH 7 in the suspension.

The present invention, relating to a process of producing insulin crystal suspensions having a protracted effect is based on the following discoveries:

If ox or veal insulin crystals of the above mentioned kind are suspended in an aqueous medium having a pH-value of 5.5 and having a composition such that the content of free M-ions in the resulting suspension is so low that at pH 7 in the medium the insulin crystals will contain less than 5–6 metal atoms per unit cell, it will be found that this suspension at pH 5.5 has no appreciable protracted effect. If, on the other hand, the suspension is given a pH 7, the effect of the suspension will surprisingly prove to be appreciably prolonged. This is all the more surprising in the light of the properties of insulin crystals derived from pig pancreas glands. If a suspension such as the above mentioned is produced from pig insulin and is given a pH of 5.5, this suspension will not possess any protracted effect, nor will it do so if the pH-value is changed to 7, the pig insulin crystals thereby going into solution.

Further, it has been found that the time of action of aqueous suspensions of ox or veal insulin crystals will be increased if these suspensions are stored for an extended period of time at room temperature or at more elevated temperatures and if they have a pH-value essentially below 7, while there will be no change of the time of action of practical importance if the suspensions have a pH-value of about 7 (6.5 to 7.5). An insulin preparation is required to be stable, and tests have shown that the stability of these suspensions will be obtained at a pH-value of about 7 (6.5 to 7.5) and only within this pH-range.

According to the above observations, the process of the invention, by which there is produced a suspension of insulin crystals in an injectable medium, is characterized by the fact that use is made of insulin crystals derived from ox or veal pancreas and having a rhombohedral structure and the form of twin crystals, "stars" or deformed rhombohedrons, and by the fact that use is made of an aqueous medium having, or given, a degree of acidity such that the pH-value of the suspension will be about 7 (6.5 to 7.5), and having such a composition as to ions of metals which promote the crystallization of the insulin, and as to substances, such as buffer substances which bind these ions, such that the suspended insulin crystals at pH 7 in the medium will exhibit a content of said metals of at most 5–6 atoms per unit cell corresponding to at most 0.25 to 0.30 milliequivalent of metal per gram of the dried crystals.

It is possible to carry out the process by suspending pre-prepared insulin crystals in an injectable aqueous medium. In such a case, it is preferred to use insulin crystals which have not been subjected to any drying since drying has proved to decrease the time of action of the suspensions.

It is, however, more appropriate to carry out the crystallization of the insulin under sterile conditions and to give the crystallization medium a composition such that it is injectable so that, according to the invention, the mother liquor of the crystals is used as the crystallization medium, to which has been added any missing substances, such as water, isotonics and preserving agents.

The time of action of the suspensions produced depends on the size of the suspended insulin crystals, the time of action being shortened when the crystal size is decreased. According to the invention, use is preferably made of insulin crystals having a predetermined and uniform size of up to about $40\mu$. It is possible to effect an adjustment of the crystal size e.g. by means of the processes which are the subject of U.S. Patent No. 2,819,999 and U.S. Patent No. 2,799,622.

It is preferred to use an aqueous medium not containing substances, such as buffer substances, which bind free M-ions, in which case the total content of M-ions of the suspension produced will at most amount to $13 \times A \times 10^{-3}$ milliequivalents per liter, A indicating the number of insulin units per milliliter.

The insulin crystal suspensions produced according to the invention possess an initial effect superior to that which is obtainable with known aqueous insulin crystal suspensions containing, in addition thereto, amorphous insulin in suspension and which have been given a higher content of zinc ions such that the suspended insulin crystals at pH 7 in the suspension medium will contain about 2.3% of zinc.

If it is desired to obtain a more elevated initial effect in the insulin crystal suspensions produced according to the invention, use may be made of an addition of a solution of insulin derived from pig pancreas glands, said solution having the same pH-value. The stability of the suspensions is not influenced thereby under storage.

The following example illustrates the process according to the invention.

*Example*

3.48 grams of ox insulin crystals containing 0.78% of zinc are suspended in 100 milliliters of water and dissolved by addition of 4 milliliters of 1 N HCl. The solution is sterile filtered and diluted with sterile water up to 150 milliliters. To this solution is added 50 milliliters of 0.4 mole sodium acetate containing sodium hydroxide in an amount such that the mixture has a pH of 5.5. After mixing, the insulin crystallizes as the mixture is slowly stirred for about 24 hours, whereafter the suspension is diluted by the addition of 1800 milliliters of methyl-p-hydroxy benzoate solution containing 0.11% of methyl-p-hydroxy benzoate and 14 grams of sodium chloride and sufficient NaOH that the pH-value of the final suspension will be 7.3 to 7.4.

Instead of using sodium acetate buffer, as in the above example, it is possible to use sodium phosphate or sodium citrate buffer. It is also possible to use insulin crystals having a lower zinc content or insulin crystals having a content of crystallization-promoting metals other than zinc.

Further, the aqueous suspension medium may be given an extra addition of ions of crystallization-promoting metals.

Having thus fully described my invention I claim as new and desire to secure by Letters Patent:

1. An injectable insulin preparation having a clinically-useful protracted effect with respect to the lowering of blood sugar which comprises a sterile injectable aqueous medium having a pH value of 6.5 to 7.5 and containing suspended therein a plurality of crystals of insulin of bovine pancreas gland origin, said crystals being selected from the group consisting of bovine insulin crystals having the form of twins, bovine insulin crystals having the form of stars, and bovine insulin crystals having the form of deformed rhombohedrons, said crystals having a content of crystallization-promoting metals of at most 5 to 6 metal atoms per crystallographic unit containing 390 atoms of protein nitrogen.

2. An injectable insulin preparation as defined in claim 1, wherein said pH value is 7.0.

3. An injectable insulin preparation as defined in claim 1, wherein said crystals have the form of twins.

4. An injectable insulin preparation as defined in claim 1, wherein said crystals have the form of stars.

5. An injectable insulin preparation as defined in claim 1, wherein said crystals have the form of deformed rhombohedrons.

6. An injectable insulin preparation as defined in claim 1, wherein said crystals contain 2 to 5 metal atoms per crystallographic unit containing 390 atoms of protein nitrogen.

7. An injectable insulin preparation as defined in claim 6, wherein said metal is zinc.

8. An injectable insulin preparation as defined in claim 1, wherein said preparation also contains, dissolved therein, insulin derived from pig pancreas glands.

9. A process of producing insulin crystal suspensions having a protracted effect which comprises suspending in an aqueous injectable medium insulin crystals derived from bovine pancreas glands and having a rhombohedral structure, imparting to said aqueous medium an acidity such that the pH of the suspension is 6.5 to 7.5, said medium containing ions of metals promoting crystallization of the insulin in an amount that at pH 7 the suspended insulin crystals will have a content of said metals of at most 5 to 6 metal atoms per crystallographic unit containing 390 atoms of protein nitrogen, corresponding to at most 0.25 to 0.30 milliequivalent of metal per gram of the dried crystals, said insulin crystals having not previously been dried and said suspension medium being the mother liquor from which the crystals are formed.

10. A process as defined in claim 9, further comprising the step of adding to said suspension a solution of insulin derived from pig pancreas glands.

References Cited in the file of this patent

UNITED STATES PATENTS

| | | |
|---|---|---|
| 2,799,622 | Schlichtkrull | July 16, 1957 |
| 2,882,202 | Petersen et al. | Apr. 14, 1959 |